US009045994B2

United States Patent
Bidkar et al.

(10) Patent No.: US 9,045,994 B2
(45) Date of Patent: Jun. 2, 2015

(54) FILM RIDING AERODYNAMIC SEALS FOR ROTARY MACHINES

(71) Applicant: General Electric Company, Schenectady, NY (US)

(72) Inventors: Rahul Anil Bidkar, Niskayuna, NY (US); Matthew Michael Langenderfer, Palm Coast, FL (US); Hrishikesh Vishvas Deo, Saratoga Springs, NY (US); Azam Mihir Thatte, Rotterdam, NY (US)

(73) Assignee: General Electric Company, Niskayuna, NY (US)

( * ) Notice: Subject to any disclaimer, the term of this patent is extended or adjusted under 35 U.S.C. 154(b) by 85 days.

(21) Appl. No.: 13/665,431

(22) Filed: Oct. 31, 2012

(65) Prior Publication Data

US 2014/0119912 A1 May 1, 2014

(51) Int. Cl.
*F16J 15/447* (2006.01)
*F01D 11/02* (2006.01)
*F16J 15/44* (2006.01)

(52) U.S. Cl.
CPC ............ *F01D 11/02* (2013.01); *Y10T 29/49826* (2013.01); *F01D 11/025* (2013.01); *F16J 15/442* (2013.01); *F05D 2240/55* (2013.01)

(58) Field of Classification Search
USPC ......... 277/411, 412, 413, 416, 500, 543, 545, 277/546, 578; 415/115, 138
See application file for complete search history.

(56) References Cited

U.S. PATENT DOCUMENTS

| | | | |
|---|---|---|---|
| 2,181,203 A * | 11/1939 | Reynolds | 277/504 |
| 3,809,443 A | 5/1974 | Cherubim | |
| 4,223,958 A | 9/1980 | Gray | |
| 5,100,158 A | 3/1992 | Gardner | |
| 5,370,402 A | 12/1994 | Gardner et al. | |
| 5,427,455 A | 6/1995 | Bosley | |
| 5,632,493 A * | 5/1997 | Gardner | 277/411 |
| 5,791,868 A | 8/1998 | Bosley et al. | |
| 5,833,369 A | 11/1998 | Heshmat | |

(Continued)

FOREIGN PATENT DOCUMENTS

| | | | |
|---|---|---|---|
| EP | 0995933 A2 | 4/2000 | |
| EP | 2495398 A2 | 9/2012 | |

OTHER PUBLICATIONS

PCT Search Report and Written Opinion dated Jan. 30, 2014, issued in connection with corresponding WO Application No. PCT/US2013/067356.

*Primary Examiner* — Kristina Fulton
*Assistant Examiner* — Eugene G Byrd
(74) *Attorney, Agent, or Firm* — John P. Darling (57) ABSTRACT

A seal assembly for a rotary machine is provided. The seal assembly includes multiple sealing device segments disposed circumferentially intermediate to a stationary housing and a rotor. Each of the sealing device segments includes a stator interface element. The sealing device segment also includes a shoe plate having one or more labyrinth teeth facing the rotor and a load-bearing surface region, wherein the shoe plate allows a high pressure fluid to an upstream portion of the forwardmost labyrinth tooth and a low pressure fluid to a downstream portion of the aftmost labyrinth tooth. The sealing device segment further includes a secondary seal in contact with the stator interface element at a radially outer end and in contact with an elevated nose of the shoe plate on a radially inner end; and multiple bellow springs or flexures attached to the shoe plate and to the stator interface element.

22 Claims, 12 Drawing Sheets (56) References Cited

U.S. PATENT DOCUMENTS

| | | | |
|---|---|---|---|
| 5,902,049 A * | 5/1999 | Heshmat | 384/106 |
| 5,915,841 A | 6/1999 | Weissert | |
| 6,145,843 A * | 11/2000 | Hwang | 277/400 |
| 6,390,476 B1 * | 5/2002 | Tong et al. | 277/355 |
| 6,505,837 B1 * | 1/2003 | Heshmat | 277/411 |
| 6,527,274 B2 | 3/2003 | Herron et al. | |
| 6,655,696 B1 * | 12/2003 | Fang et al. | 277/409 |
| 6,811,154 B2 | 11/2004 | Proctor et al. | |
| 6,840,519 B2 * | 1/2005 | Dinc et al. | 277/413 |
| 7,044,470 B2 | 5/2006 | Zheng | |
| RE39,190 E | 7/2006 | Weissert | |
| 7,216,871 B1 | 5/2007 | Datta | |
| 7,226,053 B2 * | 6/2007 | Nakano et al. | 277/355 |
| 7,261,300 B2 * | 8/2007 | Agrawal et al. | 277/399 |
| 7,614,792 B2 * | 11/2009 | Wade et al. | 384/104 |
| 7,726,660 B2 | 6/2010 | Datta | |
| 8,002,285 B2 | 8/2011 | Justak | |
| 8,074,997 B2 | 12/2011 | Garrison et al. | |
| 8,113,771 B2 * | 2/2012 | Turnquist et al. | 415/173.3 |
| 8,172,232 B2 | 5/2012 | Justak | |
| 2002/0192074 A1 * | 12/2002 | Turnquist et al. | 415/173.3 |
| 2003/0071422 A1 | 4/2003 | Holder | |
| 2003/0102630 A1 * | 6/2003 | Dinc et al. | 277/355 |
| 2003/0131602 A1 | 7/2003 | Ingistov | |
| 2004/0046327 A1 * | 3/2004 | Menendez et al. | 277/412 |
| 2004/0119238 A1 * | 6/2004 | Skumawitz et al. | 277/412 |
| 2004/0207158 A1 * | 10/2004 | Agrawal et al. | 277/364 |
| 2008/0003099 A1 | 1/2008 | Giesler et al. | |
| 2008/0309019 A1 * | 12/2008 | Wolfe et al. | 277/420 |
| 2011/0121519 A1 | 5/2011 | Justak | |
| 2011/0304101 A1 | 12/2011 | Grondahl et al. | |
| 2012/0193875 A1 | 8/2012 | Deo et al. | |
| 2012/0223483 A1 * | 9/2012 | Bidkar et al. | 277/301 |
| 2013/0058765 A1 * | 3/2013 | Zheng et al. | 415/173.1 |
| 2014/0008871 A1 * | 1/2014 | Bidkar et al. | 277/303 |

* cited by examiner

FILM RIDING AERODYNAMIC SEALS FOR ROTARY MACHINES

BACKGROUND

The present application relates generally to seal assemblies for turbo-machinery and more particularly relates to film riding seal assemblies for sealing rotor-stator gaps and the like.

Various types of turbo-machinery, such as gas turbine engines, aircraft engines and steam turbines are known and widely used for power generation, propulsion, and the like. The efficiency of the turbo-machinery depends in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps from regions of high pressure to regions of low pressure may result in poor efficiency for the turbo-machinery. Such leakage may impact efficiency in that the leaked fluids fail to perform useful work.

Different types of sealing systems are used to minimize the leakage of fluid flowing through turbo-machinery. The sealing systems, however, often are subject to relatively high temperatures, thermal gradients, and thermal and mechanical expansion and contraction during various operational stages that may increase or decrease the clearance therethrough. For example, traditional labyrinth seals that are assembled to run very tight clearance during start-up transient phase might run with large clearances during steady state operations, thereby leading to poor performance at steady state operation.

There is therefore a desire for improved compliant sealing assemblies for use with turbo-machinery for sealing rotor-stator gaps. Preferably such compliant sealing assemblies may provide tighter sealing during steady state operations while avoiding rubbing, wear caused by contact and damage during transient operations. Such sealing assemblies should improve overall system efficiency while being inexpensive to fabricate and providing an increased life for the associated parts.

BRIEF DESCRIPTION

In accordance with an embodiment of the invention, a seal assembly for a rotary machine is provided. The seal assembly includes multiple sealing device segments disposed circumferentially intermediate to a stationary housing and a rotor. Each of the sealing device segments includes a stator interface element. The sealing device segment also includes a shoe plate having one or more labyrinth teeth facing the rotor and a load-bearing surface region, wherein the shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. The sealing device segment further includes a secondary seal configured to be in contact with the stator interface element at a radially outer end and configured to be in contact with an elevated nose of the shoe plate on a radially inner end; and a plurality of bellow springs or flexures connected to the shoe plate and to the stator interface element.

In accordance with an embodiment of the invention, a method of manufacturing a sealing device segment is provided. The method includes disposing a shoe plate comprising one or more labyrinth teeth facing the rotor and a load-bearing surface region intermediate to a stationary housing and a rotor in a rotary machine, wherein the shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. The method also includes arranging a secondary seal to be in contact with a stator interface element at a radially outer end and in contact with an elevated nose of the shoe plate on a radially inner end. Further, the method includes connecting a plurality of bellow springs or flexures to the shoe plate and to the stator interface element.

In accordance with an embodiment of the invention, a rotary machine is provided. The rotary machine includes a rotor, a stator housing and multiple sealing device segments disposed circumferentially intermediate to the stationary housing and the rotor, wherein each of the segments comprises a stator interface element and a shoe plate comprising one or more labyrinth teeth facing the rotor and a load-bearing surface region, wherein the shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. Each of the segments also includes a secondary seal configured to be in contact with the stator interface element at a radially outer end and configured to be in contact with an elevated nose of the shoe plate on a radially inner end and multiple bellow springs or flexures connected to the shoe plate and to the stator interface element.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
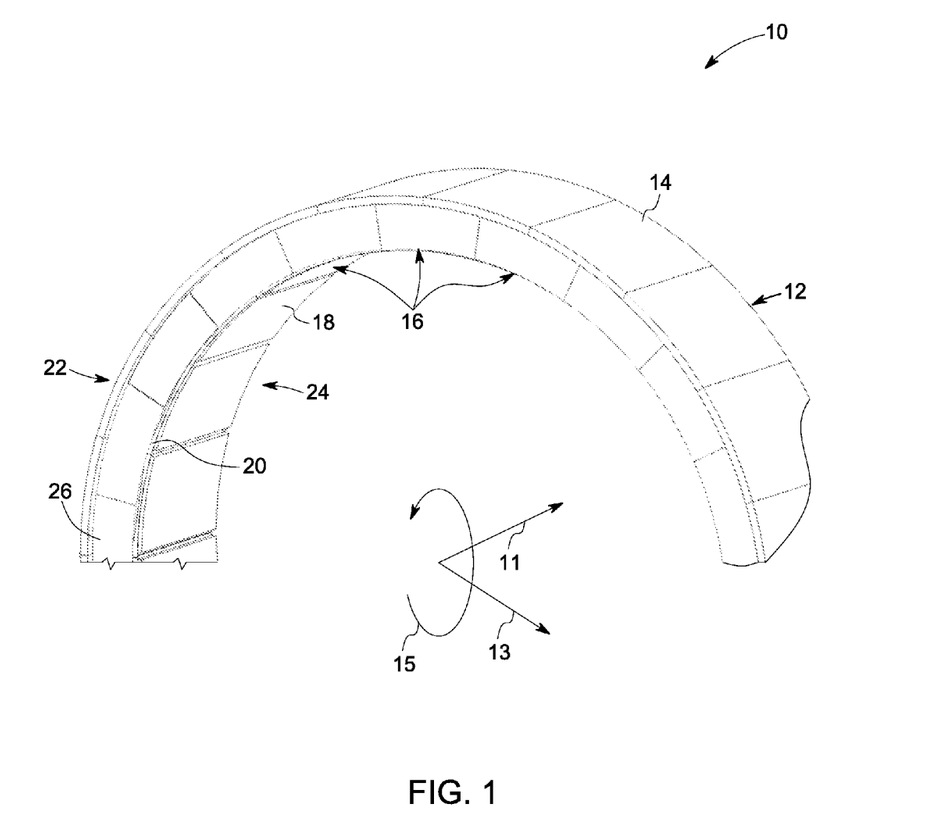
FIG. 1 is a perspective view of a film riding seal assembly of a rotary machine in accordance with an embodiment of the present invention.

FIG. 1 is a perspective view of a film riding seal assembly 10 (only a few segments are shown instead of the entire 360 degree assembly) for a rotary machine in accordance with an embodiment of the present invention. The film riding seal assembly 10 is shown to have an orientation in axial, radial and circumferential direction as given by 11, 13 and 15 respectively. The seal assembly 10 is circumferentially arranged around a rotor shaft (not shown) that is axially located in the rotary machine such that the seal assembly 10 is intermediate to a stationary housing 12 and the rotor shaft (not shown). The stationary housing 12 includes multiple stator interface elements 14 that form the radially outwards region of the seal assembly 10. The seal assembly 10 includes multiple sealing device segments 16 located adjacent to each other to form the seal assembly 10. Each of the sealing device segment 16 includes a shoe plate 18 located proximate to the rotor shaft (not shown). During operation of the rotary machine, the shoe plate 18 rides on a fluid film above the rotor shaft (not shown). The seal assembly 10 also includes one or more labyrinth teeth 20 located on the shoe plate 18 at a side facing the rotor shaft surface. In one embodiment as shown, the one or more labyrinth teeth 20 are located towards forward-most region of the shoe plate 18. In another embodiment, the one or more labyrinth teeth 20 are located towards an aftmost region of the shoe plate 18. The one or more labyrinth teeth 20 substantially separate a high pressure region 22 from a low pressure region 24 on either sides of the seal assembly 10 of the rotary machine. The seal assembly 10 also includes multiple secondary seals 26 configured to be in contact with the stator interface elements 14 at a radially outer end and configured to be in contact with the shoe plate 18 on a radially inner end. In one embodiment, the secondary seal 26 includes an outer layer section 28 (shown in FIG. 2) and an inner layer section 30 (shown in FIG. 2) such that each of the outer layer section 28 of the secondary seal 26 overlaps the sealing device segment gaps formed between inner layer sections 30 of adjacent secondary seal segments 16.

Figure 2:
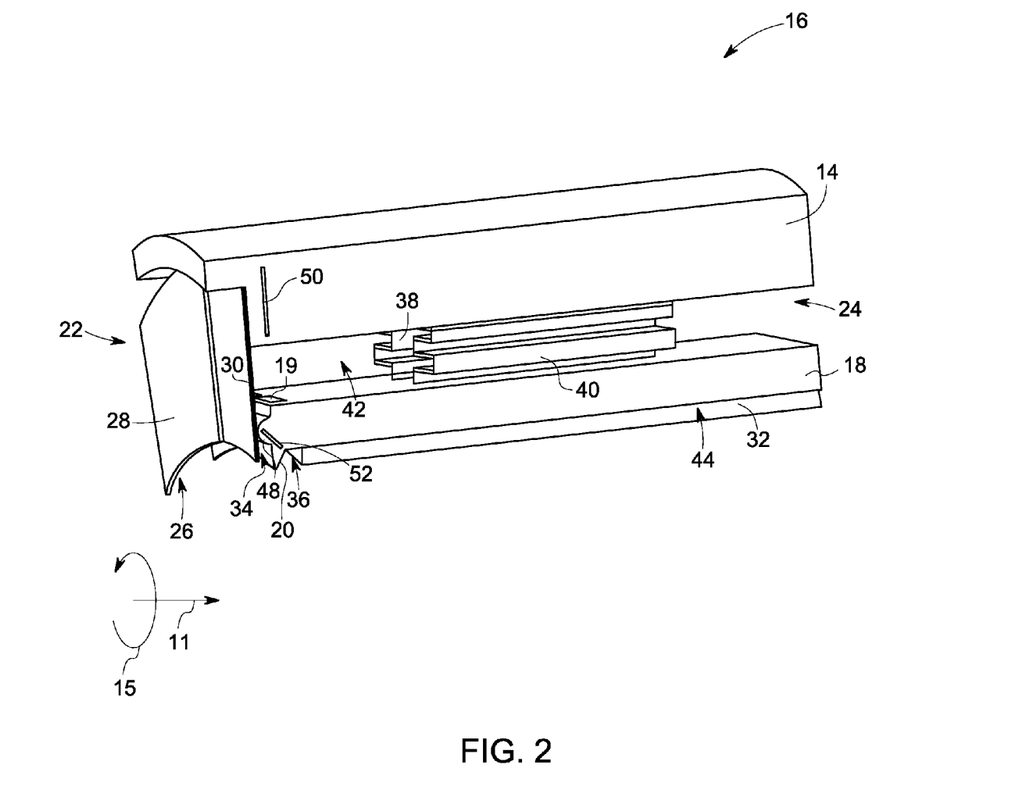
FIG. 2 is a perspective view of a sealing device segment in accordance with an embodiment of the present invention.

FIG. 2 is a perspective view of the sealing device segment 16 in accordance with an embodiment of the present invention. As shown, the sealing device segment 16 includes stator interface element 14 and the shoe plate 18. In the embodiment as shown, the shoe plate 18 includes the one or more labyrinth teeth 20 facing the rotor and a load-bearing surface region 32. The shoe plate 18 is configured to allow a high pressure fluid to an upstream portion 34 of forwardmost labyrinth tooth 20 and a low pressure fluid to a downstream portion 36 of the aftmost labyrinth tooth 20 and further configured to generate an aerodynamic force between the shoe plate 18 and the rotor. The sealing device segment 16 also includes multiple bellow springs 38, 40 attached to the shoe plate 18 and the stator interface element 14. In one embodiment, the sealing device segment 16 includes multiple flexures attached to the shoe plate 18 and the stator interface element 14 instead of the multiple bellow springs.

As shown, the shoe plate 18 includes one or more ports 19 located axially downstream of the one or more labyrinth teeth 20 for allowing flow of low pressure fluid from the downstream portion 36 of aftmost labyrinth tooth 20 to the rear cavity 42. In one embodiment, the one or more ports 19 are angled for allowing flow of the low pressure fluid in a radial direction from behind the labyrinth teeth 20 into a rear cavity 42 formed by the plurality of bellow springs 38, 40 or flexures, the stator interface element 14 and the shoe plate 18. In another embodiment, the one or more ports 19 are angled for allowing flow of the low pressure fluid in a circumferential direction causing the fluid to swirl as the fluid transfers from behind the labyrinth teeth to radially above the shoe plate 18. The swirl causes the fluid to gain tangential velocity in a direction of rotation of the rotor or opposite to the direction of rotation of the rotor. The shoe plate 18 also includes feeding grooves 44 oriented axially on both sides of the load-bearing surface region 32 of the shoe plate 18. The one or more ports 19 on the shoe plate 18 located axially downstream of the labyrinth teeth 20 along with the feeding grooves 44 ensure that low pressure fluid is present downstream of the labyrinth teeth 20.

Further as shown, the sealing device segment 16 also includes the secondary seal 26 with the outer layer section 28 and an inner layer section 30. In one embodiment, the inner layer section 30 is attached via welding or brazing with the stator interface element 14 at a radially outer end. The outer layer section 28 of the secondary seal 26 includes an overhanging portion that overlaps the segment gaps between the inner layer sections 30 of neighboring sealing device segments 16. The details of the outer layer section 28 of the secondary seal 26 are illustrated further in FIG. 3, which shows adjacent sealing device segments 16 of the film riding seal assembly 10.

Figure 3:
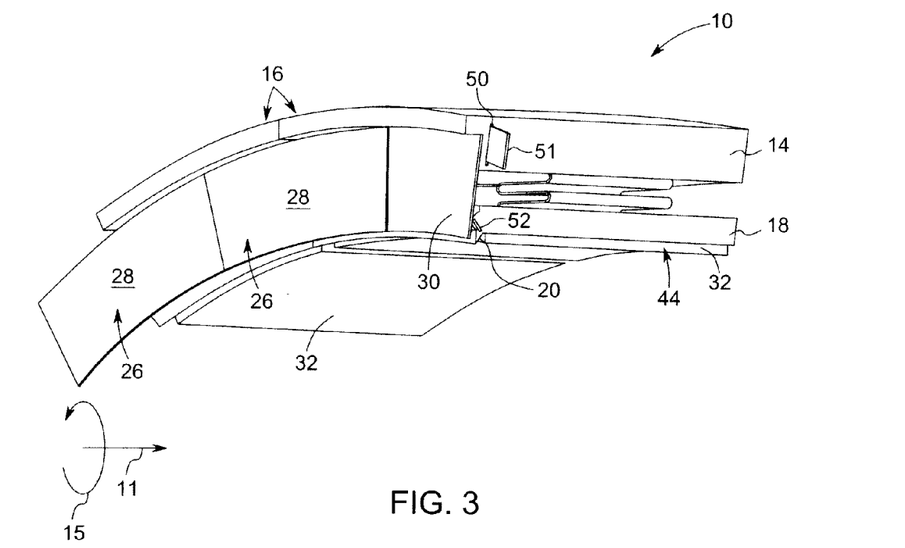
FIG. 3 is a perspective view of adjacent sealing device segments of a film riding seal assembly of a rotary machine in accordance with an embodiment of the present invention.

As shown in FIG. 3, a portion of the outer layer section 28 of the secondary seal 26 is attached with the stator interface element or the inner layer section 30 via welding or brazing at the radially outer end. The remaining overhanging portion of the outer layer section 28 overlaps the segment gaps between the inner layer sections 30 of neighboring sealing device segments 16. The overhanging portion of the outer layer 28 extends beyond the single sealing device segment 16 and is ship lapped with the inner layer section 30 of adjacent sealing device segment 16. Further, the outer layer 28 is free to slide over the inner layer sections 30 of neighboring sealing device segments 16. As shown in FIG. 3, only the inner layer section 30 of the secondary seal 26 is configured to be in a line contact with an elevated nose 48 of the shoe plate 18 on the radially inner side.

Furthermore in the embodiments shown in FIG. 2 and FIG. 3, the stator interface element 14 includes one or more grooves or slots 50 at sides for allowing disposal of spline seal shims 51 for reducing segment-gap leakage between stator interface elements 14 of neighboring sealing device segments

16. Similarly, the shoe plate might include grooves or slots 52 for allowing disposal of spline seal shims for reducing segment-gap leakages between shoe plates 18 of neighboring sealing device segments 16.

Figure 4:
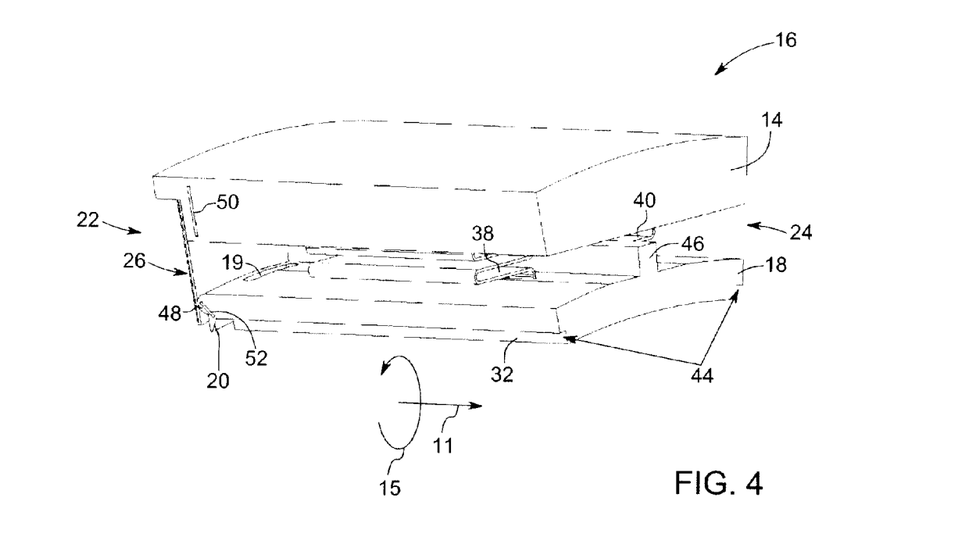
FIG. 4 is a perspective view of a sealing device segment in accordance with another embodiment of the present invention.

FIG. 4 shows another perspective view of the sealing device segment 16 in accordance with an embodiment of the present invention. In one embodiment as shown, the shoe plate 18 also includes one or more axial rib sections 46. The one or more axial rib sections 46 are used to increase the flexural stiffness of the shoe plate 18 against aerodynamic and aerostatic loads during operation of the rotary machine.

Figure 5:
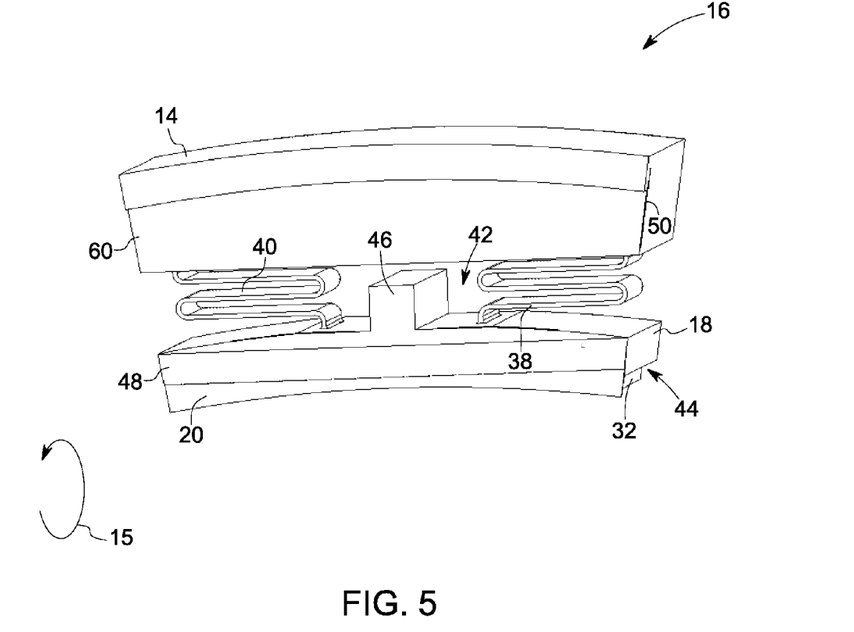
FIG. 5 is a front perspective view of a portion of a sealing device segment in accordance with an embodiment of the present invention.

FIG. 5 is a front perspective view of a portion of a sealing device segment in accordance with an embodiment of the present invention. It is to be noted that the secondary seal 26 has not been shown for the purpose of illustrating a flat region 60 of the stator interface element where the radially outer end of the inner layer section 30 (shown in FIG. 2 and FIG. 3) of the secondary seal 26 (shown in FIG. 2, FIG. 3 and FIG. 4) is attached via brazing or welding.

Figure 6:
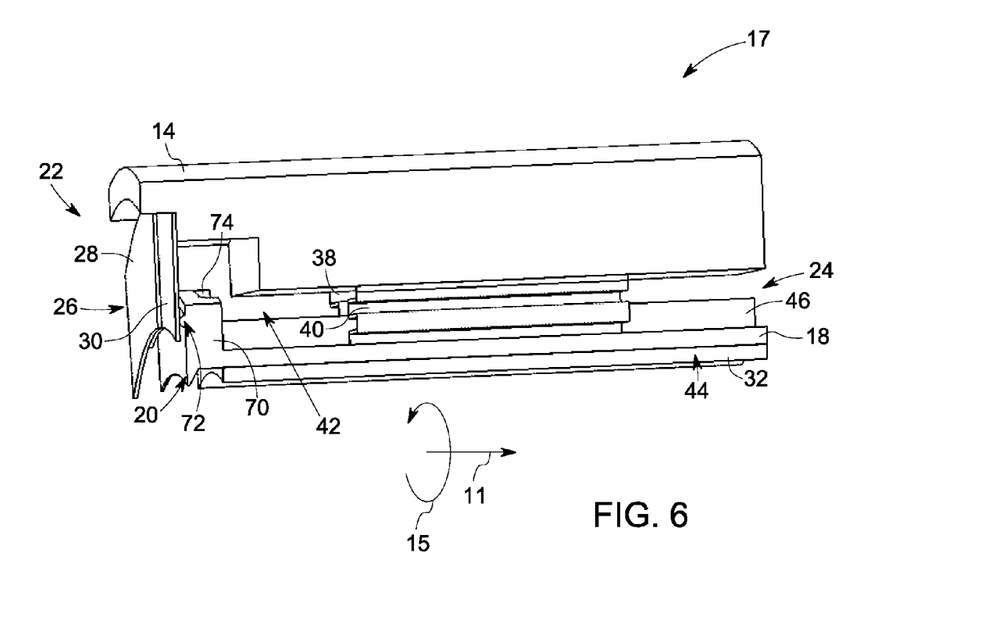
FIG. 6 is a perspective view of a sealing device segment in accordance with another embodiment of the present invention.

FIG. 6 is a perspective view of a sealing device segment 17 in accordance with another embodiment of the present invention. As shown, the shoe plate 18 includes a L-shaped structure 70 with an elevated nose section 72 for contact with the inner layer section 30 of the secondary seal 26. The L-shaped structure includes one or more labyrinth teeth 20 located towards a front end of the shoe plate 18 for separating the high pressure side 22 from the low pressure side 24. In this embodiment, the L-shaped structure includes one or more ports 74 for allowing flow of low pressure fluid from the downstream portion of aftmost labyrinth tooth 20 to the rear cavity 42.

Figure 7:
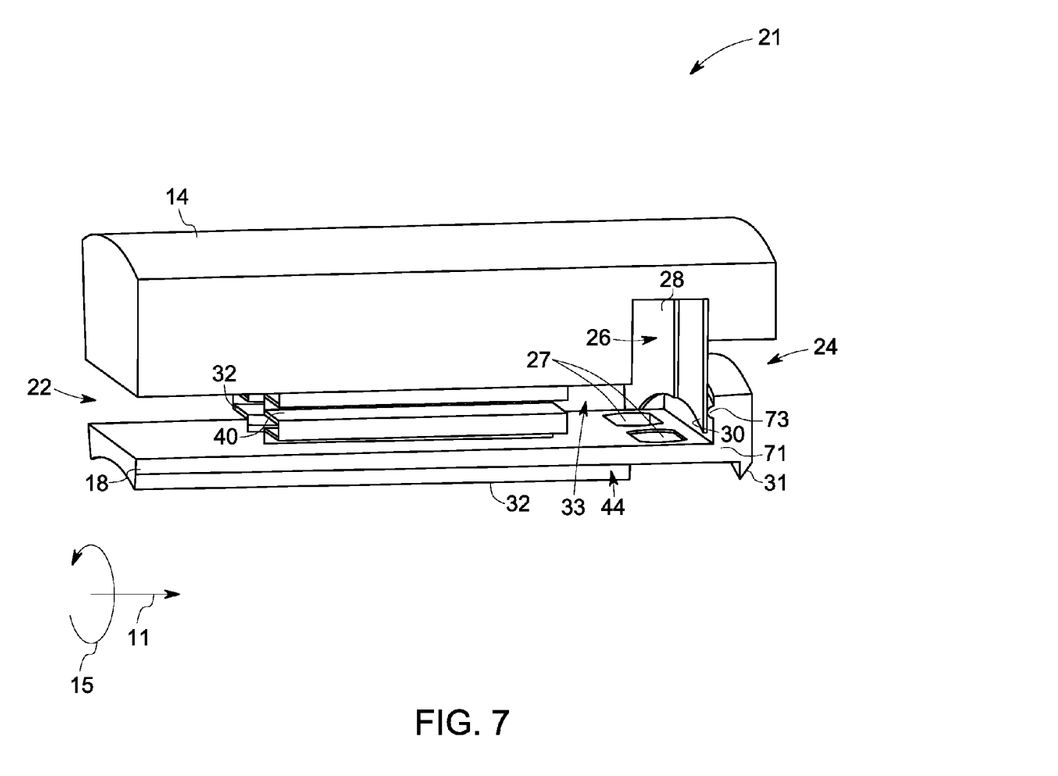
FIG. 7 is a perspective view of a sealing device segment in accordance with yet another embodiment of the present invention

FIG. 7 is a perspective view of a sealing device segment 21 in accordance with yet another embodiment of the present invention. In this embodiment, the shoe plate 18 includes a L-shaped structure 71 with an elevated nose section 73 for contact with the inner layer section 30 of the secondary seal 26. The L-shaped structure includes one or more labyrinth teeth 31 located towards a backward end of the shoe plate 18 for separating a high pressure side from a low pressure side and one or more ports 27 for allowing flow of high pressure fluid from a front cavity 33 formed by the plurality of bellow springs 38, 40 or flexures, the stator interface element 14 and the shoe plate 18 to an upstream portion of frontmost labyrinth tooth 31. In one embodiment, the one or more ports 27 are angled for allowing flow of the high pressure fluid in a radial direction from the front cavity 33 to the upstream portion of the forwardmost labyrinth tooth 31. In another embodiment, the one or more ports 27 are angled for allowing flow of the high pressure fluid in a circumferential direction causing the fluid to swirl as the fluid transfers from the front cavity 33 to the upstream portion of the forwardmost labyrinth tooth 31.

Figure 8:
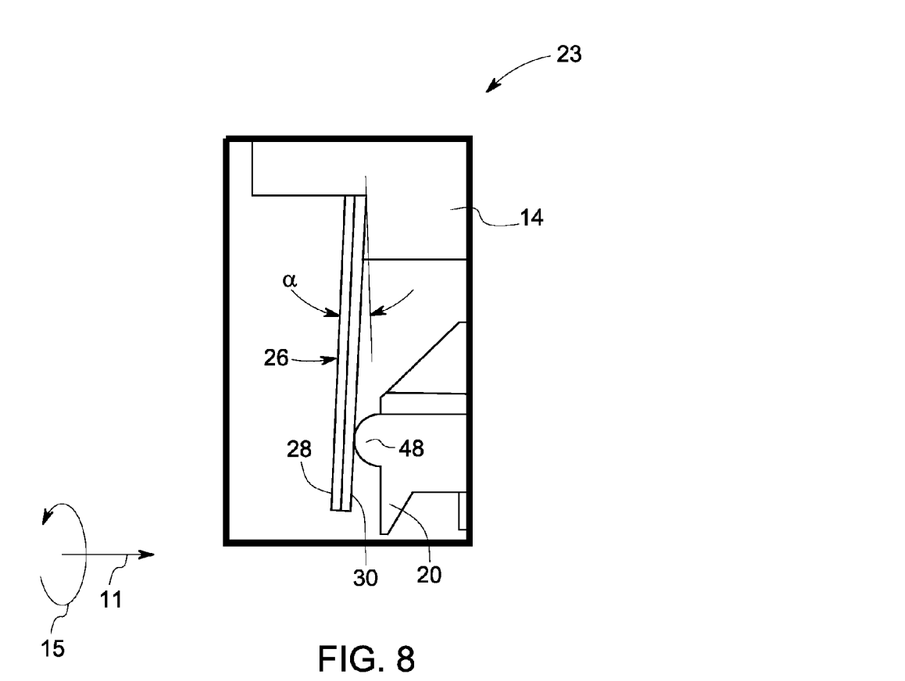
FIG. 8 is a portion of a sealing device segment in accordance with one embodiment of the present invention.

FIG. 8 shows a portion of a sealing device segment 23 in accordance with one embodiment of the present invention. The secondary seal 26 with the outer layer section 28 and the inner layer section 30 is attached to the stator interface element 14 such that the secondary seal 26 is tilted with respect to a direction perpendicular to an axial direction of the rotary machine to include an optimum angle 'a'. This optimum angle 'a' is included for attaining an almost constant magnitude of contact force for compensating the reduced contact force caused in the event of reduction in effective length of the pressure-loaded portion of the secondary seal 26.

Figure 9:
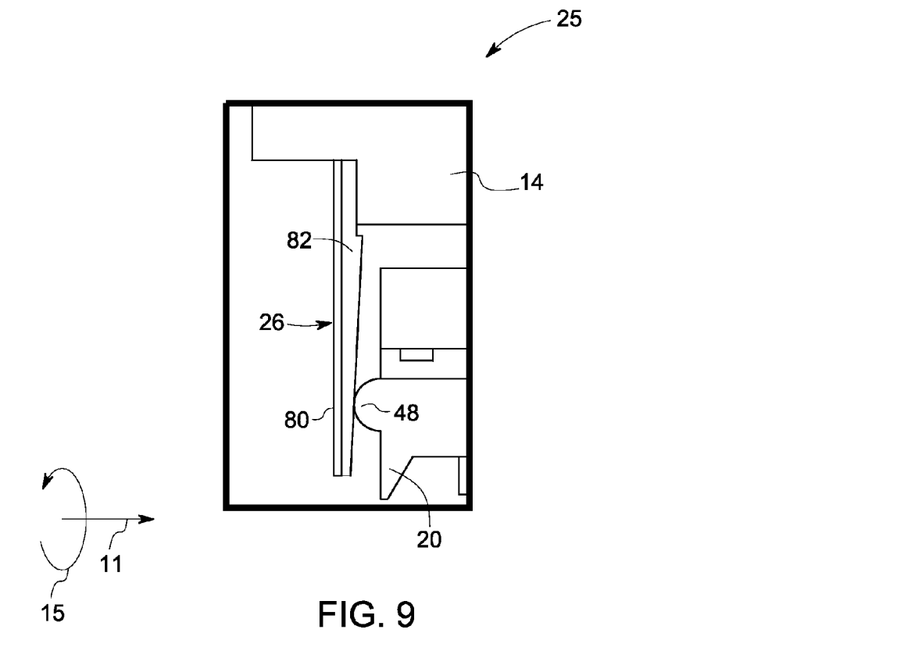
FIG. 9 is a portion of a sealing device segment in accordance with another embodiment of the present invention.

FIG. 9 shows a portion of a sealing device segment 25 in accordance with one embodiment of the present invention. As shown, in this embodiment, the secondary seal 26 includes an outer layer section 80 and an inner layer section 82 with a slanted profile for maintaining an almost constant force between the secondary seal 26 and the elevated nose 48 of the shoe plate 18 at the line contact during radial motion of the shoe plate 18.

Figure 10:
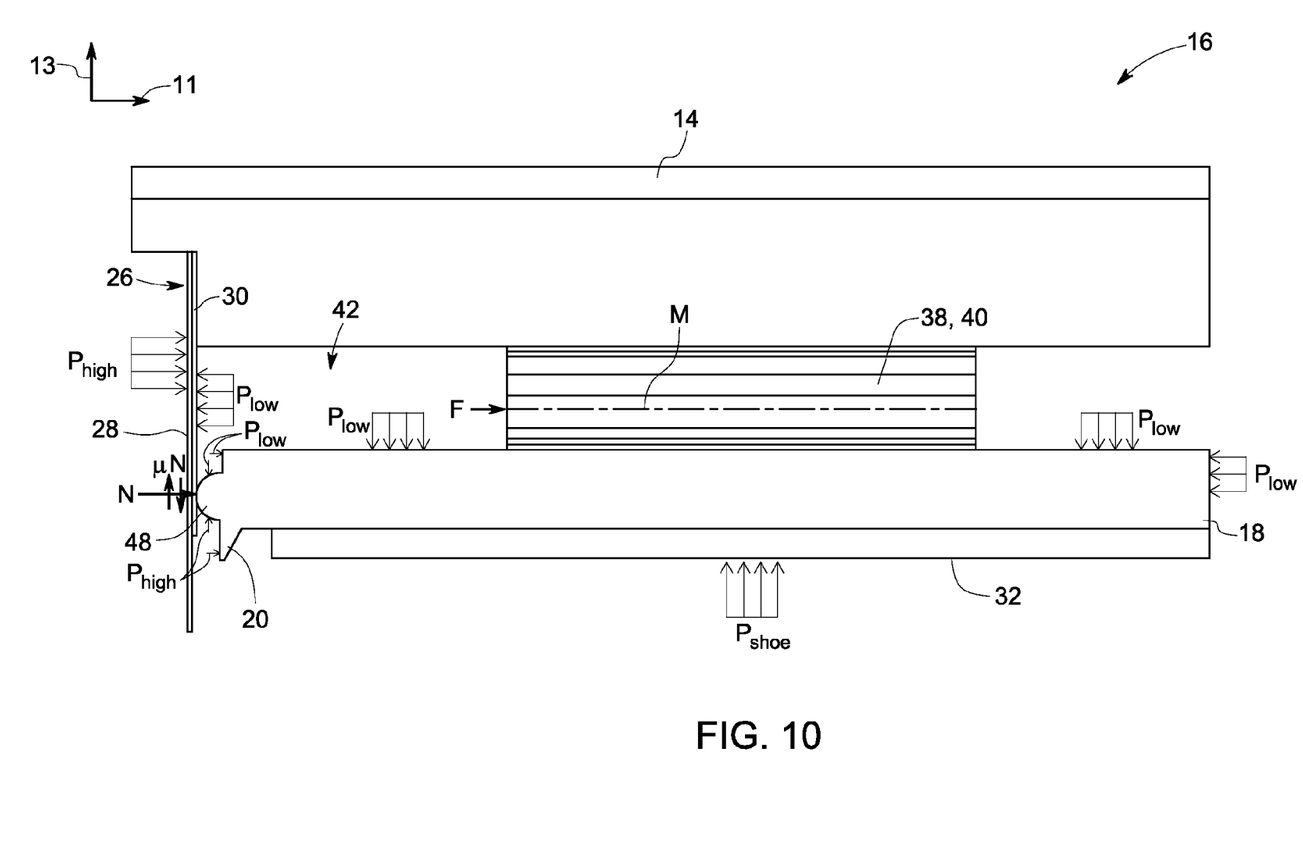
FIG. 10 is a side view of the sealing device segment showing various pressure forces acting on the shoe plate and the secondary seal in accordance with an embodiment of the present invention.

FIG. 10 is a side view of the sealing device segment 16 that shows various pressure forces acting on the shoe plate 18 and the secondary seal 26 in accordance with an embodiment of the present invention. In a non-limiting example, the shoe plate 18 may ride on a fluid film in an aerostatic mode of operation, where the fluid film thickness may range from about 3/1000 inches to 5/1000 inches depending on an initial seal assembly clearance with the rotor. In the aerostatic mode of operation, the forces acting on the shoe plate 18 are an axial force N due to contact force from secondary seal 26, wherein the secondary seal 26 is subjected to pressure force $P_{high}$ on forward side and pressure force $P_{low}$ on aft side during pressurization, a friction force μN due to contact force from the secondary seal 26, a small radial opening force on the shoe plate 18 due to unequal pressures force $P_{low}$, $P_{high}$, respectively above and below the elevated nose 48, and an axial force caused by the unequal pressures on the radially vertical faces of the shoe plate 18. It is to be noted that the load-bearing surface region 32 is subjected to a pressure force $P_{shoe}$ and the shoe face on the inner cavity side is subjected to the pressure force $P_{low}$. Upon pressurization and in the absence of rotation, since majority of the axial pressure drop occurs across the labyrinth tooth 20, the pressure $P_{shoe}$ is almost equal to $P_{low}$. In this aerostatic sense, the shoe plate 18 is inherently pressure balanced in radial direction for most of the shoe length leaving only a very small opening force caused by the unbalanced radial force across the elevated nose 48. Such a pressure-balanced seal is advantageous for both low and high-pressure applications, where the pressurization will not cause the seal to open and leak excessively. It is to be noted that the sealing device segment 17 as shown in FIG. 6 may include similar pressure forces acting on the shoe plate 18 and the secondary seal 26 as discussed with respect to the sealing device segment 16. However, it is to be further noted that for the embodiment 21 shown in FIG. 7, the above discussion is equally valid except that the pressure force within the front cavity 33 is $P_{high}$ and the pressure force $P_{shoe}$ is almost equal to $P_{high}$. Furthermore, in these various embodiments as shown in FIG. 2, FIG. 6 and FIG. 7, the moment-balance is addressed with the zero-tilt design explained below and the effects of rotor speed are addressed in the aerodynamic mode of operation.

In this embodiment as shown in FIG. 10, the position of the contact between the secondary seal 26 and the stator interface element 14 at the radially outer end, the position of the contact between the inner layer section 30 of the secondary seal 26 with the shoe plate 18 at the radially inner end (i.e. the location of the elevated nose); and the attachment location of the plurality of bellow springs 38, 40 or flexures to the shoe plate 18 and to the stator interface element 14 at predetermined positions are based on a relative position of a line of action of an effective axial force F, acting on the plurality of bellow springs or flexures for attaining a zero or small front-aft tilt of the shoe plate. The position of line of action of effective axial force F acting on the plurality of bellow springs or flexures is defined as the sum of moments caused due to all the applied forces on the shoe (moments calculated about the point located at the axial midspan of the bellow springs 38, 40 or flexures where the bellow springs 38, 40 or flexures connect with the shoe plate 18) divided by the total axial force acting on the shoe plate 18. It is to be noted that a zero-tilt causes the shoe plate to remain parallel to the rotor before, after and during pressurization of the rotary machine. This zero-tilt of the shoe plate 18 is achieved when the line of action of the effective axial force F acts on a midpoint (radial direction) of the bellow springs 38, 40 or flexures. As shown in this embodiment, the relative position of the effective axial force F is the midpoint M, wherein M is half of a length measured radially from the attachment of the plurality of bellow springs 38, 40 or flexures with the shoe plate 18 to attachment of the plurality of bellow springs 38, 40 or flexures with the stator interface element 14. During manufacturing, the line of action of the effective axial force F is ensured to pass through the midpoint M by adjusting one or more of the dimensions of the shoe plate 18 (thickness or location of elevated nose 48 or radius of elevated nose 48), dimensions and material properties of the secondary seal 26 (length, thickness, tilt angle/profile), dimensions and material of the plurality of bellows springs or flexures (radial height, thickness), friction properties of the secondary seal 26 and the shoe plate 18. It is to be noted that the shoe plate 18 may ride on a fluid film in an aerodynamic mode of operation, where the fluid film thickness may range from about 0.3/1000 inches to 3/1000 inches depending on an initial seal assembly clearance with the rotor. The discussion above for force balance and zero-tilt aerostatic mode is equally valid for aerodynamic mode except that the pressures $P_{shoe}$ are different (higher) in the case of aerodynamic mode compared to the aerostatic mode due to the shoe design features described later. The additional pressure $P_{shoe}$ is balanced by a radial spring force caused due to the compression of the bellow springs or flexures.

Figure 11:
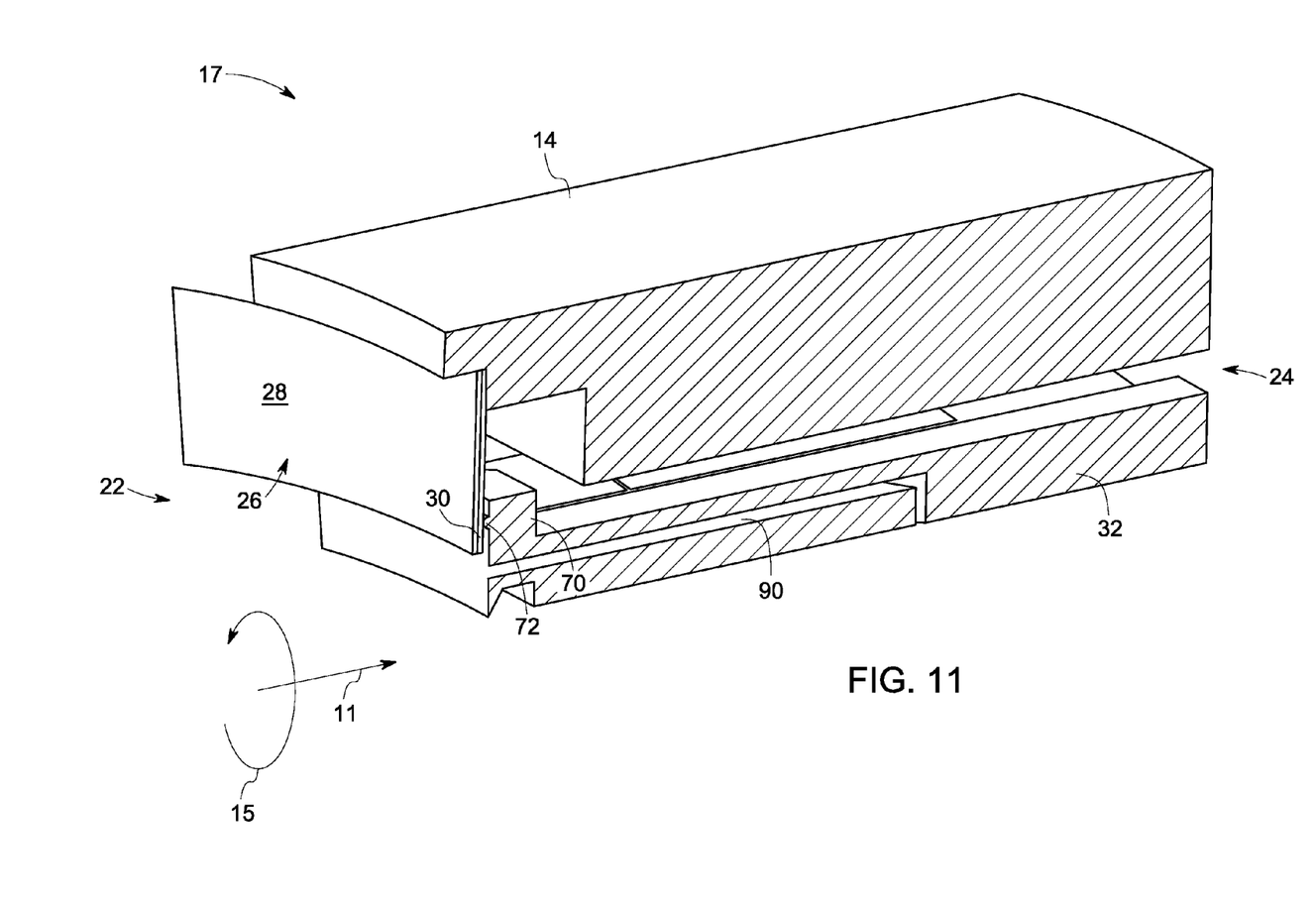
FIG. 11 is a cross-section view at center of the sealing device segment 17 in accordance with an embodiment of the present invention.

FIG. 11 is a cross-section view at center of the sealing device segment 17 in accordance with an embodiment of the present invention. As shown, the shoe plate 18 includes one or more pressurization ports 90 located axially for allowing flow of the high pressure fluid to a rotor-shoe gap. This high pressure fluid causes a small opening force that moves the shoe plate 18 radially outwards by about 1/1000 inch to 2/1000 inch. This initial lift or opening is important for sealing device segments that are assembled line-on-line with the rotor or assembled with an interference with the rotor. The one or more pressurization ports 90 provide the advantage for assembling the sealing device segments 17 closer to the rotor. The one or more pressurization ports 90 help avoid start-up rubs by providing an aerostatic pressure distribution between the rotor and the shoe plate, thereby lifting the shoe plate 18 away from the rotor during the initial rotation start-up phase when the aerodynamic force is not large enough to avoid shoe plate-rotor contact. The axial location of the port 90 is suitably chosen such that the aerostatic pressure distribution causes a uniform shoe plate lift-off without any front-aft tilting of the shoe. In another embodiment, a flexible tube (not shown in FIG. 11) is routed suitably to carry high pressure fluid to the load-bearing surface. The flexibility of the tube is designed to allow for radial motion of the shoe plate 18 without any additional radial stiffness caused by the tube connection.

Figure 12:
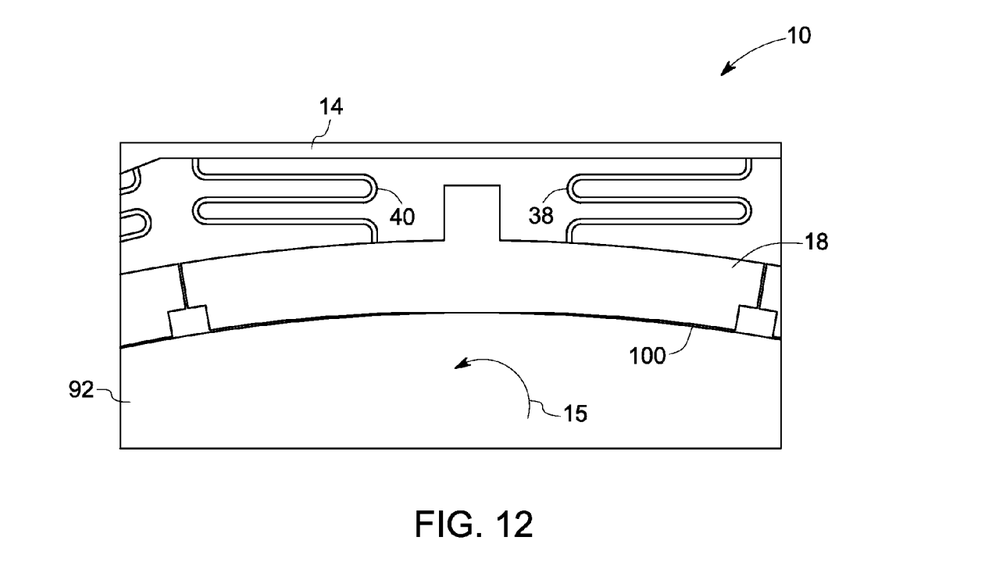
FIG. 12 shows a shoe-rotor curvature in the seal assembly in accordance with an embodiment of the present invention.

FIG. 12 shows a shoe-rotor curvature in the seal assembly 10 in accordance with an embodiment of the present invention. The seal assembly 10 also operates in an aerodynamic mode of operation. When the rotor-shoe plate gap starts reducing (e.g. during a thermal transient event causing clearance change), a thin fluid film 100 starts building additional pressure. In this embodiment, the radius of curvature of the shoe plate 18 is intentionally machined to be larger than the rotor radius. As a consequence, when the rotor-shoe plate gap becomes small (typically less than 1/1000 inch), the fluid film 100 is either monotonically converging or converging-diverging in the direction of rotation. This fluid film in a form of fluid wedge causes additional pressure to build-up. The physics of thin film is well understood from hydrodynamic journal bearings or foil bearings, and can be modeled using appropriate fluid flow models. The basic principle is that any negative gradient in the fluid film thickness in the direction of rotation will increase the pressure in the fluid film above its boundary pressure. The additional pressure caused by the thin fluid film squeezes the bellow springs 38, 40 thereby, moving the shoe plate 18 radially outwards and keeping the rotor 92 from contacting the shoe plate 18. In this sense, any outward excursion of the rotor 92 is tracked by the shoe plate 18 on every sealing device segment 16, 17, 23, 25.

Figure 13:
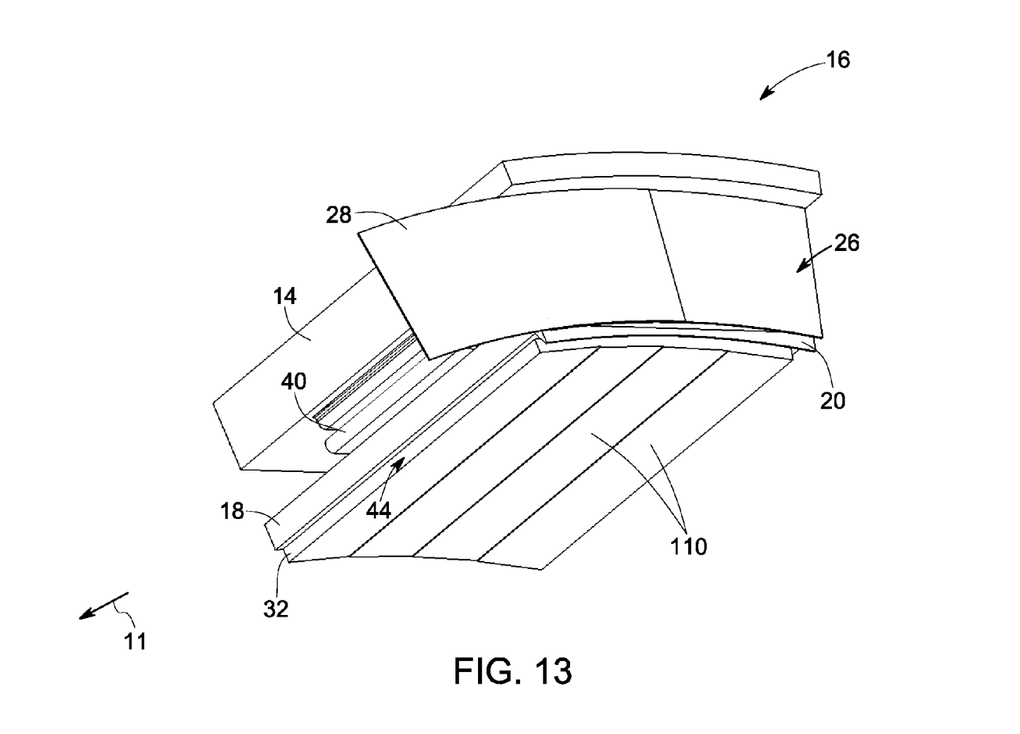
FIG. 13 shows grooves on a load-bearing surface in a sealing device segment in accordance with an embodiment of the present invention.

In another embodiment as shown in FIG. 13, the thin fluid film generates additional aerodynamic force due to the presence of grooves 110 or pockets (not shown in FIG. 13) on the load-bearing surface region 32 facing the rotor. The grooves 110 or pockets are in the form of a series of wedges that causes formation of a convergent fluid film in the direction of rotation. The grooves 110 or pockets can be aligned at an angle relative to the axial direction. In yet another embodiment, the load-bearing surface region 32 includes one or more Rayleigh steps facing the rotor for generating the aerodynamic force.

Figure 14:
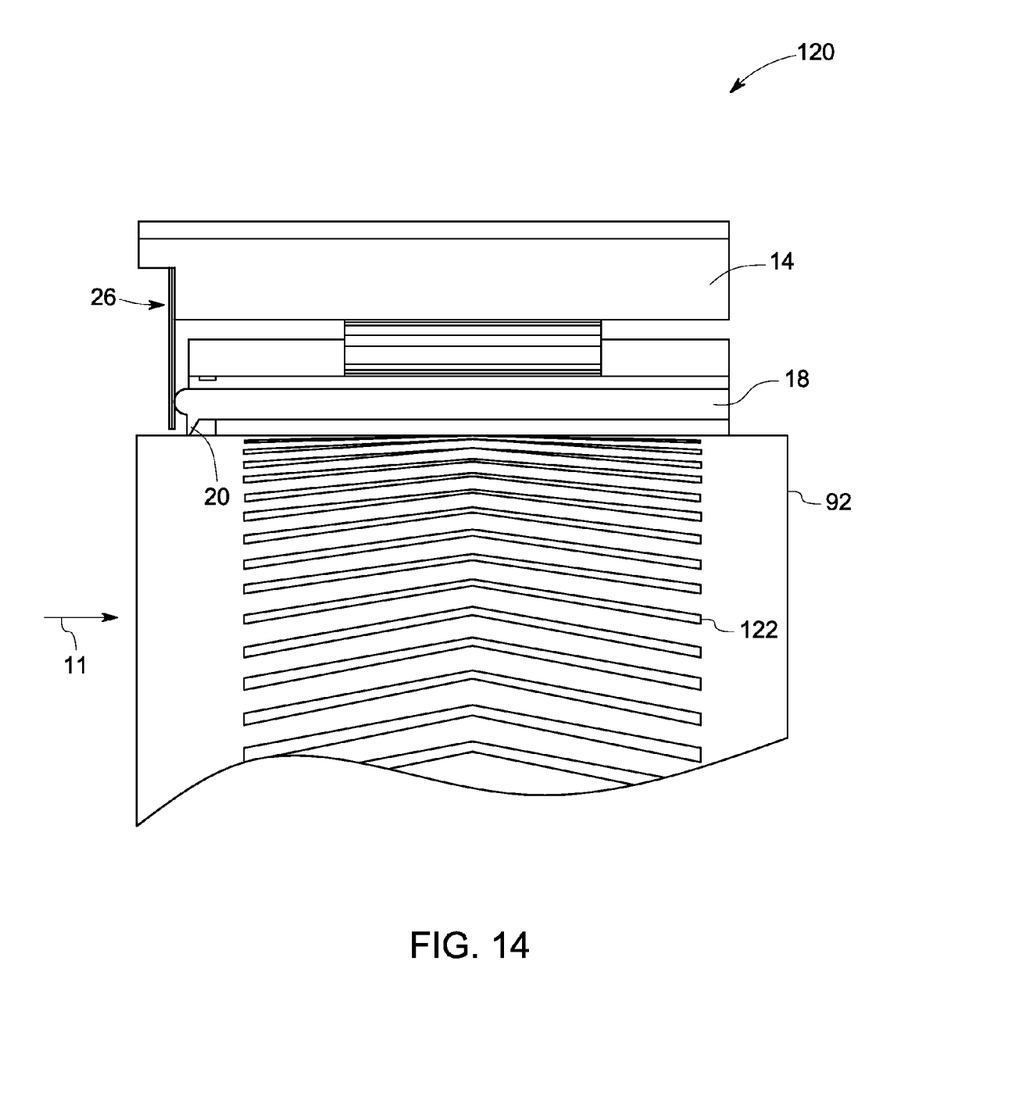
FIG. 14 shows a rotor-stator seal assembly in accordance with an embodiment of the present invention.

FIG. 14 shows a rotor-stator seal assembly 120 in accordance with an embodiment of the present invention. In one embodiment, the rotor-stator seal assembly 120 includes slots 122 in a herringbone pattern on the rotor 92 for generating aerodynamic forces during operation of the turbo-machinery. The herringbone pattern on the rotor 92 could be in the direction of rotation or opposite to the direction of rotation. In another embodiment, the rotor 92 includes grooves or pockets or slots that are in either axial or angled in a combined axial-tangential direction (these angles slots grooves or pockets are not shown in FIG. 14). Further, the slots or grooves or pockets on the rotor 92 are aligned in the direction of rotation or opposite to the direction of rotation.

Figure 15:
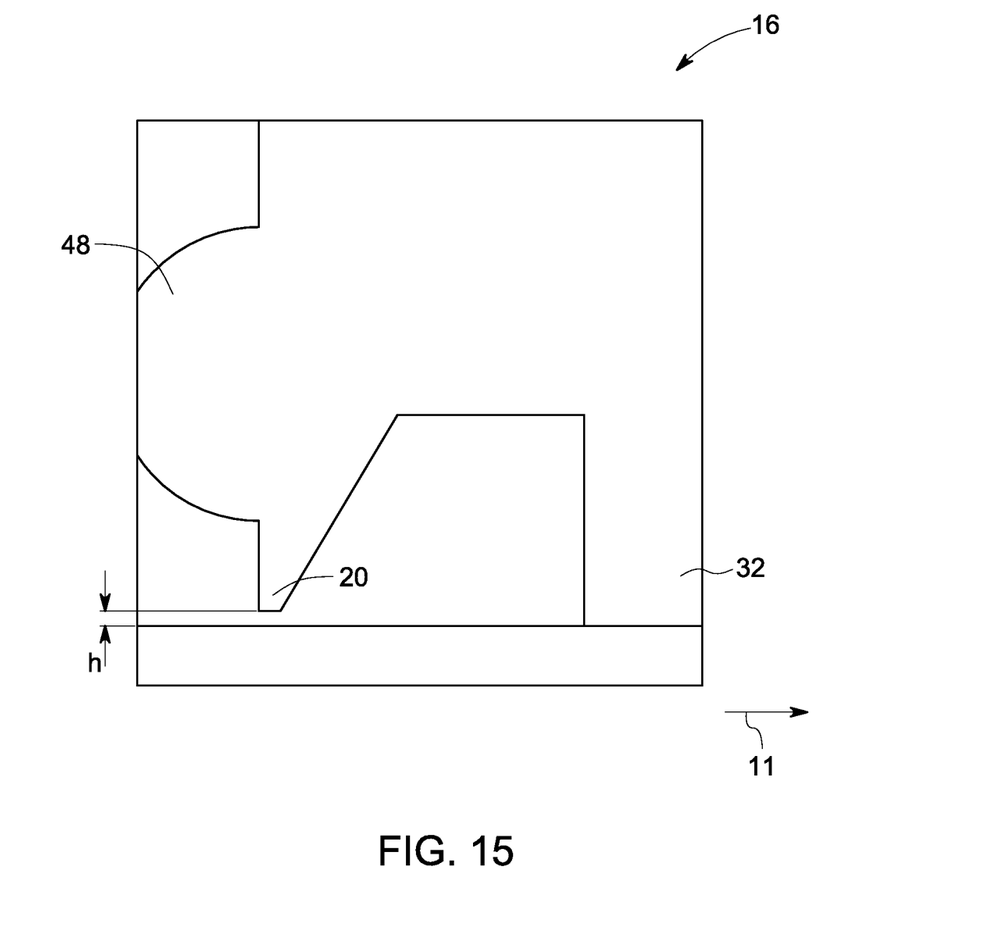
FIG. 15 shows a portion of the sealing device segment in accordance with an embodiment of the present invention.

FIG. 15 shows a cross-section view for a portion of the sealing device segment 16 where the labyrinth teeth 20 are located at a radial height 'h' away from the load-bearing surface 32. This results in the labyrinth tooth 20 running at a larger clearance from the rotor than the clearance between the load-bearing portion and the rotor. This difference in radial clearance allows for accommodation of a bi-directional tilt correction. During operation of the rotary machine, the load-bearing surface region 32 is intended to ride almost parallel to the rotor along the axial direction. However due to assembly mismatch or unexpected thermal or pressure loading, the load-bearing surface region 32 tilts so that either the forward or the aft edge of the load-bearing surface region 32 is closer to the rotor. If the aft edge is closer to the rotor, riding gap between the aft edge and the rotor is smaller than the riding gap between the forward edge and the rotor. This leads to larger aerodynamic force generation on the shoe plate 18 near the aft edge, causing a correcting aerodynamic moment on the shoe plate. This aerodynamic moment prevents the shoe plate from rubbing against the rotor on the aft edge. On the other hand, if the load-bearing surface region 32 is tilted such that the forward edge is closer to the rotor and if the dimension 'h' (as described above) is zero, then the labyrinth teeth 20 might rub into the rotor because of the insufficient area available to generate aerodynamic moment needed for correcting the shoe plate tilt. However, a non-zero clearance 'h' causes the forward edge of the load-bearing surface region 32 to interface with the rotor before the labyrinth teeth 20 rubs against the rotor, thereby allowing the load-bearing portion to generate the needed correcting aerodynamic moment.

In a non-limiting example, both the bellows springs 38, 40 and the secondary seal 26 (as shown in FIG. 2) are formed from high temperature metal alloy shims like Inconel X750 or Rene41. In one embodiment, both ends of the bellow springs 38, 40 are brazed to the stator interface element 14 and the shoe plate 18, which are machined or cast. In another embodiment, the bellow springs or flexures are machined using an EDM procedure, which allows machining of the stator interface, the bellows or flexures and the shoe from a single block of metal. In a non-limiting example, the load bearing portion 32 of the shoe plate 18 may be coated with lubricating and/or wear-resistant coating, which comprises of chromium or nickel or molybdenum as the base along with hard phases and solid lubricants. In another non-limiting example, the coating on the load-bearing surface 32 of the shoe plate 18 comprises of cobalt-based alloys. Such coatings can handle unintentional rubs between the shoe plate 18 and the rotor. In another embodiment, the rotor surface interfacing with the shoe plate 18 may be coated with chromium carbide or tungsten carbide or similar coatings to improve the rotor's hardness, corrosion resistance and the ability to maintain a good surface finish.

Figure 16:
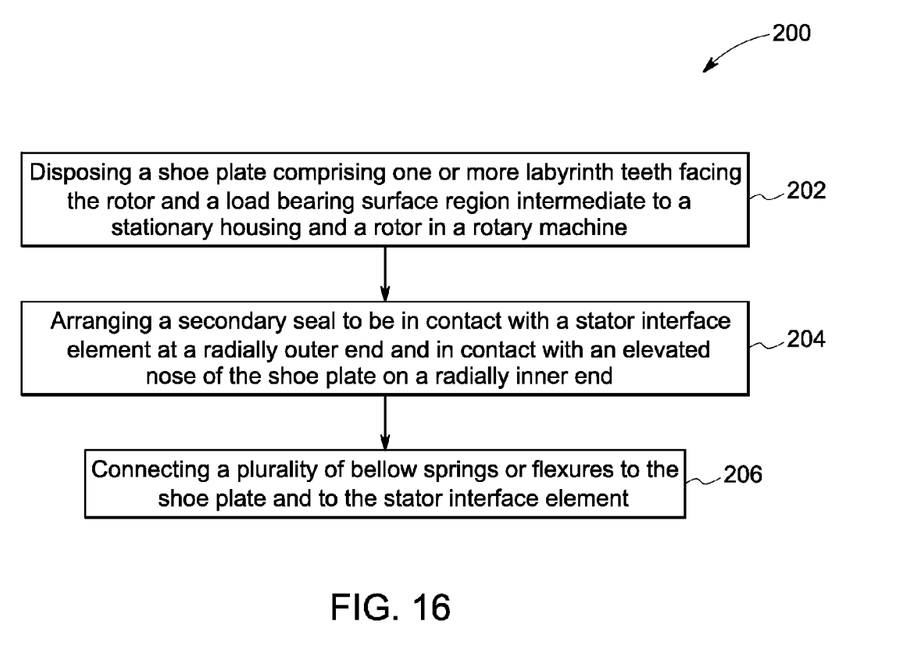
FIG. 16 is flow chart illustrating steps involved in method of manufacturing a sealing device segment in accordance with an embodiment of the present invention.

FIG. 16 is flow chart 200 illustrating steps involved in method of manufacturing a sealing device segment. At step 202, the method includes disposing a shoe plate comprising one or more labyrinth teeth facing the rotor and a load-bearing surface region intermediate to a stationary housing and a rotor in a rotary machine. The shoe plate is configured to allow a high pressure fluid to an upstream portion of the forwardmost labyrinth tooth and a low pressure fluid to a downstream portion of the aftmost labyrinth tooth and further configured to generate an aerodynamic force between the shoe plate and the rotor. At step 204, the method also includes arranging a secondary seal to be in contact with a stator interface element at a radially outer end and in contact with an elevated nose of the shoe plate on a radially inner end. Further, at method 206, the method includes connecting a plurality of bellow springs or flexures to the shoe plate and to the stator interface element. This method includes contacting the secondary seal with the stator interface element at the radially outer end and the elevated nose of the shoe plate at the radially inner end at predetermined positions based on a relative position of a line of action of an effective axial force on the plurality of bellow springs or flexures for attaining a zero or small front-aft tilt of the shoe plate.

Further the method also includes connecting an inner layer section of the secondary seal to the stator interface element and contacting the inner layer section with an elevated nose of the shoe plate. The method also includes overlapping the segment gaps between the inner layer sections of neighboring sealing device segments with an overhanging portion an outer layer section of the secondary seal.

In another embodiment, the method also includes coating on the load-bearing surface region of the shoe plate with a lubricating coating and/or a wear resistant coating. In a non-limiting example, the wear-resistant and lubricating coating on the load-bearing surface 32 of the shoe 18 comprises of chromium or nickel or molybdenum as the base along with hard phases and solid lubricants. In another non-limiting example, the coating on the load-bearing surface 32 of the shoe plate 18 comprises of cobalt-based alloys. Such coatings can handle unintentional rubs between the shoe plate 18 and the rotor. Furthermore, in another embodiment, the method includes coating a rotor surface interfacing the shoe plate with a wear-resistant coating material. In a non-limiting example, the wear-resistant coating material is chosen from a group of chromium carbide or tungsten carbide and the like.

Advantageously, the present aerodynamic seal assemblies are reliable, robust seal for several locations in rotating machinery with large pressure drops and large transients. The seal assemblies are also economical to fabricate. The non-contact operation of the seals makes them especially attractive for the large rotor transient locations. Further, the present invention allows independent controlling of the spring stiffness and the pressure resisting capability, thereby allowing the design of compliant seals that can withstand large differential pressures. Furthermore, the present invention allows for a shoe plate to remain almost parallel to the rotor along the axial direction in aerostatic operation and translate almost parallel to the rotor along the axial direction during the aerodynamic mode. The present invention also includes improved predictability for the radial motion (increased predictability for leakage performance and robustness).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seal assembly for a rotary machine, the seal assembly comprising: a plurality of sealing device segments disposed circumferentially intermediate to a stationary housing and a rotor, wherein each of the plurality of sealing device segments comprises: a stator interface element; a shoe plate comprising one or more labyrinth teeth facing the rotor and a load bearing surface region, wherein the shoe plate is configured to allow a high pressure fluid to an upstream portion of forwardmost labyrinth tooth and a low pressure fluid to a downstream portion of the aftmost labyrinth tooth and further configured to generate an aerodynamic force between the shoe plate and the rotor, a secondary seal configured to be in contact with the stator interface element at a radially outer end and configured to be in contact with an elevated nose of the shoe plate on a radially inner end, wherein the secondary seal comprises an outer layer section and an inner layer section such that each of the outer layer section of the secondary seal having an circumferentially overhanging portion overlaps a sealing device segment gap formed between inner layer section of adjacent secondary seal segments; and a plurality of bellow springs or flexures attached to the shoe plate and to the stator interface element, wherein the shoe plate comprises the one or more labyrinth teeth located towards a front end of the shoe plate for separating a high pressure side from a low pressure side in the rotary machine and one or more ports for allowing flow of low pressure fluid from the downstream portion of aftmost labyrinth tooth to a rear cavity formed by the plurality of bellow springs or flexures, the stator interface element and the shoe plate.

2. The seal assembly of claim 1, wherein the load bearing surface region of the shoe plate comprises one or more grooves or pockets on a side facing the rotor for generating an aerodynamic force.

3. The seal assembly of claim 1, wherein the load bearing surface region of the shoe plate has a radius larger than the rotor radius resulting in a formation of convergent or convergent-divergent fluid film in a tangential direction for generation of an aerodynamic force.

4. The seal assembly of claim 1, wherein the load bearing surface region and the rotor comprises a wear-resistant coating or a layer of lubricating coating on surfaces facing each other.

5. The seal assembly of claim 1, wherein the one or more ports are angled for allowing flow of the low pressure fluid in a radial direction from behind the aftmost labyrinth tooth into the rear cavity formed by the plurality of bellow springs or flexures, the stator interface element and the shoe plate.

6. The seal assembly of claim 1, wherein, the one or more ports are angled for allowing flow of the low pressure fluid in a circumferential direction causing the fluid to swirl as the fluid transfers from behind the aftmost labyrinth tooth to radially above the shoe plate.

7. The seal assembly of claim 1, wherein the shoe plate comprises a L-shaped structure with an elevated nose section for contact with the secondary seal segment.

8. The seal assembly of claim 7, wherein the L-shaped structure comprises one or more labyrinth teeth located towards a front end of the shoe plate for separating a high pressure side from a low pressure side and one or more ports for allowing flow of low pressure fluid from the downstream portion of aftmost labyrinth tooth to a rear cavity formed by the plurality of bellow springs or flexures, the stator interface element and the shoe plate.

9. The seal assembly of claim 7, wherein the L-shaped structure comprises one or more labyrinth teeth located towards a backward end of the shoe plate for separating a high pressure side from a low pressure side and one or more ports for allowing flow of high pressure fluid from a front cavity formed by the plurality of bellow springs or flexures, the stator interface element and the shoe plate to an upstream portion of frontmost labyrinth tooth.

10. The seal assembly of claim 1, wherein the shoe plate comprises one or more axial ribs.

11. The seal assembly of claim 1, wherein each of the sealing device segments comprises feeding grooves oriented axially on both sides of the load-bearing surface region of the shoe plate.

12. The seal assembly of claim 1, where the rotor comprises grooves or slots or pockets rotor angled in axial direction or combined axial and tangential direction or in a herringbone pattern, for generating an aerodynamic force.

13. The seal assembly of claim 12, wherein the grooves or slots or pockets or the herringbone pattern on the rotor are aligned in the direction of rotation or opposite to the direction of rotation.

14. The seal assembly of claim 1, further comprising a labyrinth teeth clearance more than a load bearing surface region clearance.

15. The seal assembly of claim 1, wherein the stator interface element comprises one or more grooves or slots for allowing disposal of one or more spline seal shims for reducing segment-gap leakage between stator interface elements of neighboring sealing device segments.

16. The seal assembly of claim 1, wherein the shoe plate comprises one or more pressurization ports located axially for allowing flow of the high pressure fluid to a rotor-shoe gap.

17. The seal assembly of claim 1, wherein the shoe plate comprises grooves or slots for allowing disposal of spline seal shims for reducing segment-gap leakages between shoe plates of neighboring sealing device segments.

18. The seal assembly of claim 1, wherein a location of the contact between the secondary seal and the stator interface element at the radially outer end, a location of the contact between the secondary seal with the shoe plate at the radially inner end; and an attachment location of the plurality of bellow springs or flexures to the shoe plate and to the stator interface element are at predetermined positions based on ensuring that a line of action of an effective axial force passes through the plurality of bellow springs or flexures at about the radial midspan of the bellow springs or flexures in order to attain a zero or small front-aft tilt of the shoe plate.

19. The seal assembly of claim 1, wherein the secondary seal is tilted with respect to a direction perpendicular to an axial direction of the rotary machine to include an optimum angle for attaining an almost constant magnitude of contact force for compensating the reduced contact force caused by reduction in effective length of the secondary seal.

20. The seal assembly of claim 1, wherein the secondary seal comprises an inner layer section with a slanted profile for maintaining a constant force between the secondary seal segment and the shoe plate at the line contact during radial motion of the shoe plate.

21. A rotary machine, comprising:
a rotor;
a stationary housing; and
a seal assembly according to claim 1.

22. The rotary machine of claim 21, wherein the contact between the secondary seal and the stator interface element at the radially outer end, the contact between the secondary seal with the shoe plate and the radially inner end; and the attachment of the plurality of bellow springs or flexures to the shoe plate and to the stator interface element are at predetermined positions based on ensuring that a line of action of an effective axial force passes through the plurality of bellow springs or flexures at about the radial midspan of the plurality of bellow springs or flexures in order to attain a zero or small front-aft tilt of the shoe plate.

* * * * *